(12) United States Patent
Khozikov et al.

(10) Patent No.: US 8,251,318 B2
(45) Date of Patent: Aug. 28, 2012

(54) DISBANDED CASCADED ARRAY FOR GENERATING AND MOVING PLASMA CLUSTERS FOR ACTIVE AIRFLOW CONTROL

(75) Inventors: Vyacheslav Khozikov, Seattle, WA (US); Shengyi Liu, Mercer Island, WA (US)

(73) Assignee: The Boeing Company, Chicago, IL (US)

(*) Notice: Subject to any disclaimer, the term of this patent is extended or adjusted under 35 U.S.C. 154(b) by 690 days.

(21) Appl. No.: 12/273,650

(22) Filed: Nov. 19, 2008

(65) Prior Publication Data

US 2010/0123046 A1    May 20, 2010

(51) Int. Cl.
  *B64C 21/00*  (2006.01)
(52) U.S. Cl. ...................................................... 244/205
(58) Field of Classification Search ............... 244/199.1, 244/201, 203, 204, 205, 207
  See application file for complete search history.

(56) References Cited

U.S. PATENT DOCUMENTS

| | | | |
|---|---|---|---|
| 3,095,163 A * | 6/1963 | Hill .............................. | 244/12.1 |
| 4,519,743 A | 5/1985 | Ham | |
| 5,224,826 A | 7/1993 | Hall et al. | |
| 6,033,180 A | 3/2000 | Machida | |
| 6,092,990 A | 7/2000 | Hassan et al. | |
| 6,793,177 B2 | 9/2004 | Bonutti | |
| 6,796,533 B2 | 9/2004 | Barrett et al. | |
| 7,028,954 B2 | 4/2006 | Van Dam et al. | |
| 7,281,318 B2 | 10/2007 | Marshall et al. | |
| 7,380,756 B1 | 6/2008 | Enloe et al. | |
| 7,387,491 B2 | 6/2008 | Saddoughi et al. | |
| 2008/0023589 A1 | 1/2008 | Miles et al. | |
| 2010/0127624 A1* | 5/2010 | Roy .......................... | 315/111.21 |
| 2011/0150649 A1 | 6/2011 | White | |

FOREIGN PATENT DOCUMENTS

| | | |
|---|---|---|
| EP | 1930546 | 6/2008 |
| EP | 1995171 | 11/2008 |
| WO | 2008016928 | 2/2008 |

OTHER PUBLICATIONS

Santhanakrishanan, et al., "Flow Control With Plasma Synthetic Jet Actuators," Journal of Physics D: Applied Physics, 2007, p. 637-651, vol. 40, Issue 3. (Abstract Only).

Jayaraman, et al., "Modeling of Dielectric Barrier Discharge Plasma Actuator," Journal of Applied Physics, 2008, vol. 103, Issue 5. (Abstract Only).

Hultgren, et al., "Demonstration of Separation Delay With Glow-Discharge Plasma Actuators," NASA, Dec. 2004, p. 1-15; American Institute of Aeronautics and Astronautics, Inc. (AIAA) 2003-1025.

(Continued)

*Primary Examiner* — Timothy D Collins
*Assistant Examiner* — Nicholas McFall
(74) *Attorney, Agent, or Firm* — Hope Baldauff Hartman, LLC

(57) ABSTRACT

An array of electrodes for selectively generating plasma is described herein. The array includes a first electrode disposed along a first dielectric, and at least a second electrode. A second electrode is sandwiched between the first dielectric and the second dielectric. A power supply provides electrical power to at least the first and second electrodes. In turn, a power supply controller controls the power supply, so as to regulate the electrical power supplied to at least the first and the second electrodes, and to cause the first and second electrodes to generate and move plasma to modify different airflow patterns.

16 Claims, 9 Drawing Sheets

OTHER PUBLICATIONS

Post, et al., "Separation Control Using Plasma Actuators-Dynamic Stall Control on an Oscillating Airfoil," American Institute of Aeronautics and Astronautics, Inc., (AIAA)-2004-2517; $2^{nd}$ AIAA Flow Control Conference, Jun. 28-Jul. 1, 2004, Portland, Oregon.

U.S. Appl. No. 12/432,451 entitled "Active Directional Control of Airflows Over Rotorcraft Blades Using Plasma Actuating Cascade Arrays" filed Apr. 29, 2009.

U.S. Appl. No. 12/472,116 entitled "Active Directional Control of Airflows Over Wind Turbine Blades Using Plasma Actuating Cascade Arrays" filed May 26, 2009.

U.S. Official Action dated Aug. 11, 2011 in U.S. Appl. No. 12/432,451.

U.S. Official Action dated Aug. 11, 2011 in U.S. Appl. No. 12/472,116.

International Search Report and Written Opinion dated Feb. 16, 2010 in PCT/US2009/064426.

Interview Summary filed Nov. 11, 2011 in U.S. Appl. No. 12/432,451.

U.S. Notice of Allowance dated Dec. 9, 2011 in U.S. Appl. No. 12/432,451.

U.S. Notice of Allowance dated Dec. 12, 2011 in U.S. Appl. No. 12/472,116.

* cited by examiner

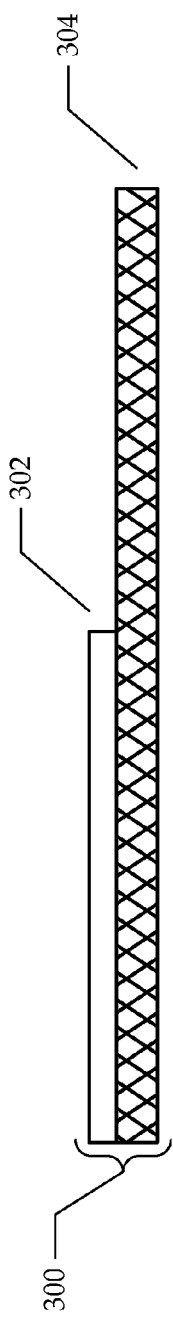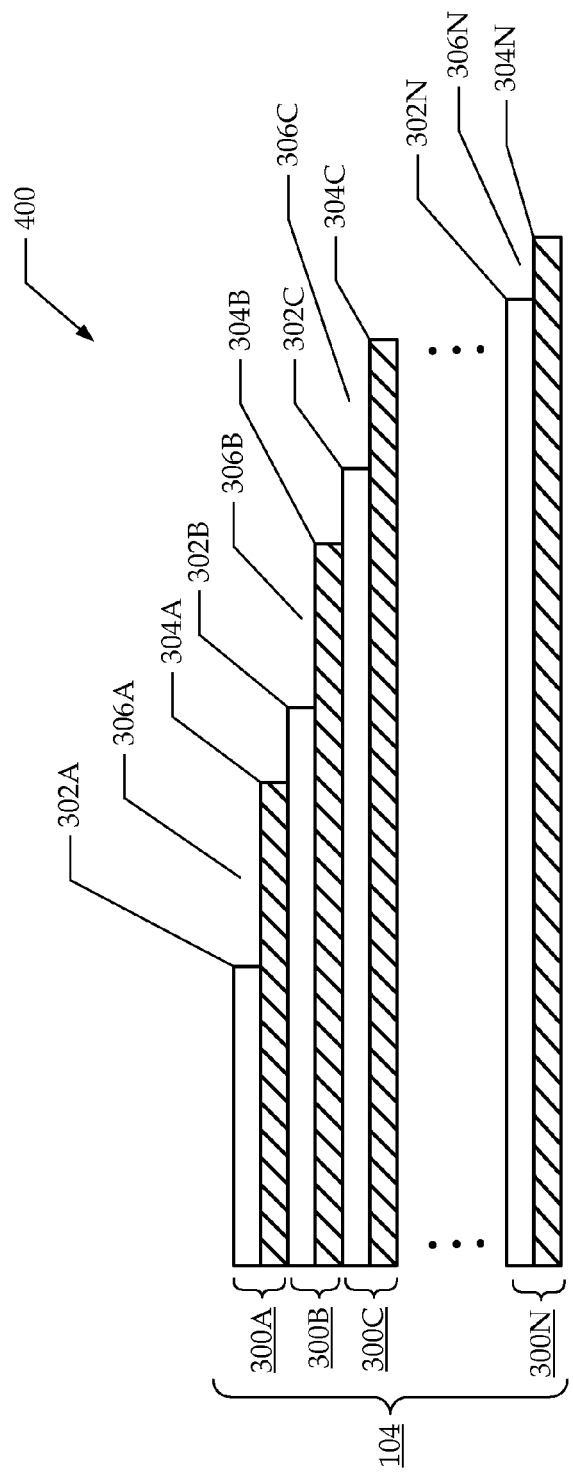

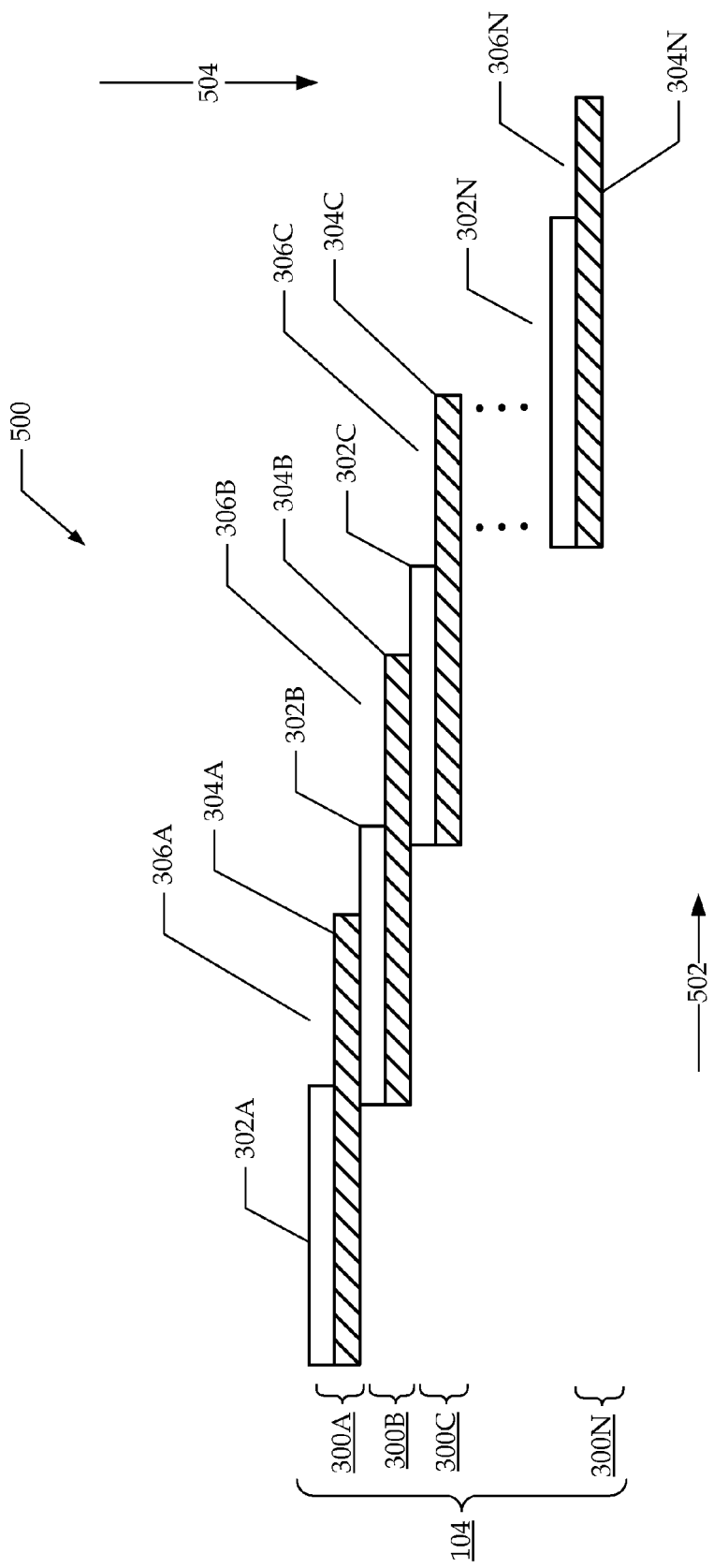

DISBANDED CASCADED ARRAY FOR GENERATING AND MOVING PLASMA CLUSTERS FOR ACTIVE AIRFLOW CONTROL

FIELD OF THE DISCLOSURE

This disclosure pertains generally to managing airflows over airfoils, and pertains more specifically to arrays of electrodes for actively generating and moving plasma clusters to manage those airflows.

BACKGROUND

In a variety of different aerodynamic scenarios, airflows occurring over airfoils may become turbulent, and in some cases, may reduce the lift characteristics of the airfoils. These reduced lift characteristics may result in reduced overall aerodynamic efficiency, as well as increased fuel consumption.

Previous techniques have addressed this issue by providing various types of active airflow control systems. However, these previous techniques typically involve mechanical, electromechanical, or pneumatic systems. Further, installing or retrofitting such systems may involve significant modification of the structure underlying the airfoil. Thus, these previous systems may be expensive to implement, in terms of cost and labor to install or retrofit onto existing airfoils.

In addition, some previous active airflow control systems incorporate several electrodes disposed along a single given dielectric. However, such systems may not efficiently utilize the surface area of an airfoil that would otherwise be available for generating plasma. For example, if the electrodes are located too close to one another, counterforces may form between adjacent electrodes. These counterforces may result in smaller, weaker clusters of plasma, which are less effective in generating bulk airflows.

To reduce the formation of these counterforces, these previous active airflow control systems may increase the distances between the electrodes along the single dielectric. However, these increased distances between electrodes may result in fewer plasma-generating units per unit of surface area on the airfoil. This decreased concentration of plasma-generating units, in turn, may reduce the efficiency of these previous airflow control systems in influencing bulk airflows.

SUMMARY

It should be appreciated that this Summary is provided to introduce a selection of concepts in a simplified form that are further described below in the Detailed Description. This Summary is not intended to be used to limit the scope of the claimed subject matter.

According to an embodiment, spatially disbanded array of electrodes for generating plasma is described herein. The array includes a first electrode disposed along a first dielectric, and at least a second electrode. A second electrode is sandwiched between the first dielectric and the second dielectric. One or more power supplies provide electrical power to the first and second electrodes. In turn, a power supply controller controls the power supply, so as to regulate the electrical power supplied to the first and the second electrodes, and to cause the first and second electrodes to generate plasma along the surface of the first dielectric.

In another embodiment, a method for constructing an array of the electrodes includes providing the first and second electrodes and the first and second dielectrics. The first dielectric is sandwiched between the first and second electrodes, and the second electrode is staggered relative to the first electrode, such that the second electrode extends beyond the first dielectric. The electrodes are placed in communication with a power supply, which provides electrical power to the electrodes. One or more power supply controllers is operative to individually control the electrical power supplied to the first and to the second electrodes, so as to generate respective plasma clusters proximate the electrodes.

In another embodiment, a method of generating plasma using the array of electrodes includes providing the array of electrodes and dielectrics, with a first electrode disposed along a first dielectric. A second electrode is sandwiched between the first dielectric and a second dielectric. Periodical electrical power is provided to the electrodes, and respective first plasma cluster is generated proximate the first dielectric during a first phase of the electrical power. The plasma clusters are then moved in response to a second phase of the electrical power, as applied to the electrodes.

The features, functions, and advantages discussed herein may be achieved independently in various embodiments of the present description or may be combined in yet other embodiments, further details of which can be seen with reference to the following description and drawings.

BRIEF DESCRIPTION OF THE DRAWINGS

FIG. 3 is a diagram illustrating a single unit that is included in the cascaded arrays shown in previous Figures.

FIG. 4 is a diagram illustrating several of the units for generating and moving plasma, which may be included in the cascaded arrays shown in previous Figures.

FIG. 5 is a diagram providing another view of units that are cascaded into arrays for generating and moving plasma.

DETAILED DESCRIPTION

The following detailed description discloses various tools and techniques related to cascaded arrays for selectively generating and moving plasma clusters. This description is most readily understood with reference to the attached drawings, in which like reference numbers may appear in different drawings to refer to similar elements.

For the purposes of this description, but without limiting possible implementations, the term "plasma" as used herein may refer to ionized gas or air molecules that result when the gas or air molecules pass through an electric field defined between two electrodes. Typically, the air molecules lose one or more electrons, or become split, therefore produce neutral, positively or negatively charged particles, and also release other free electrons.

Figure 1:
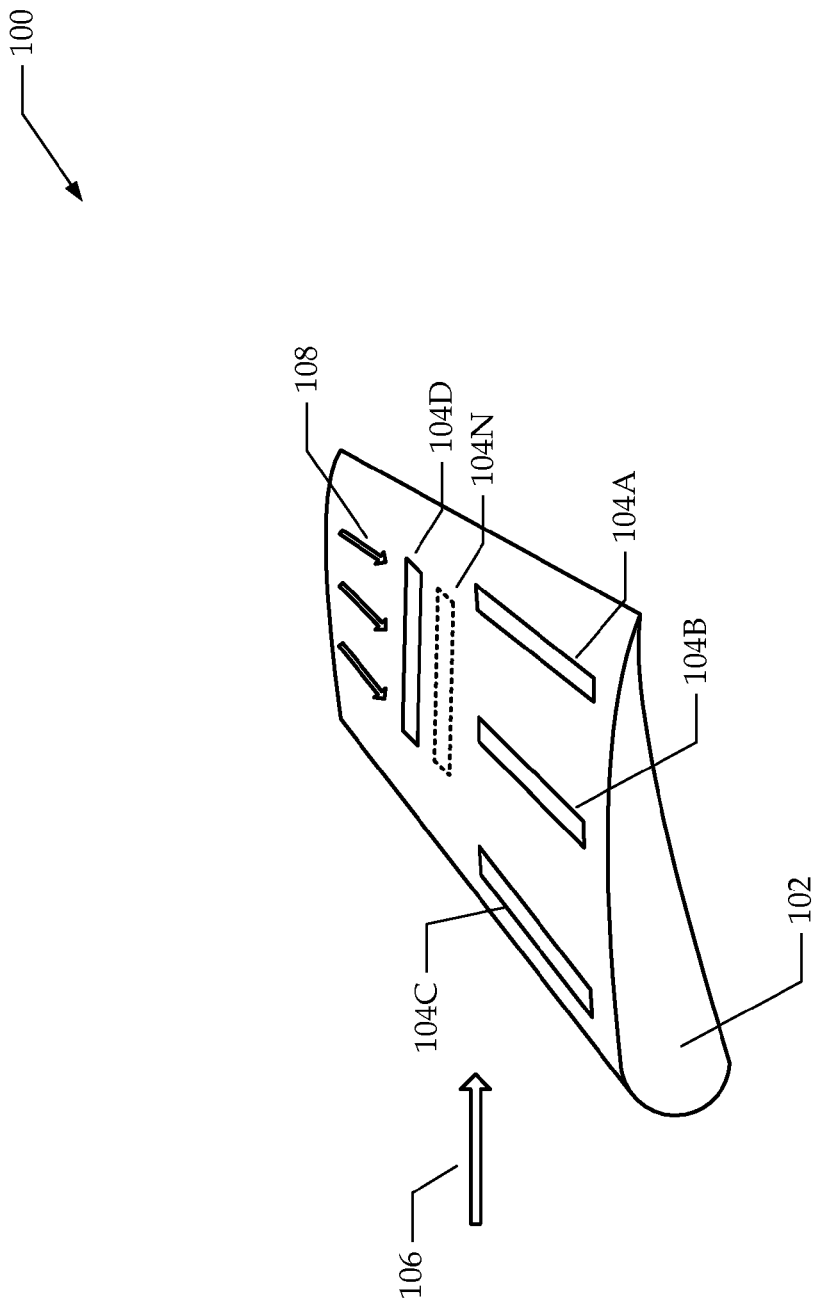
FIG. 1 is a schematic diagram illustrating example instances of cascaded arrays for selectively generating and moving plasma clusters, as installed onto an airfoil.

FIG. 1 illustrates systems, denoted generally at 100, in which an airfoil 102 has installed any number of cascaded array elements 104A, 104B, 104C, 104D, and 104N (collectively, cascaded arrays 104). The airfoil 102 may represent, for example, a fixed wing. Other examples of the airfoil 102 may include exterior surfaces of trucks, race cars, recreational vehicles, or other vehicles. The airfoils 102 may also include turbine blades. In general, the airfoil 102 may represent exterior surfaces provided by any vehicle (or components thereof) that moves or is moved through air or gas, that also experiences losses associated with drag forces imposed by the air or gas. For conciseness of description, but not to limit possible implementations, this description refers to air and gas flows collectively as airflows.

Turning to the airfoil 102 in more detail, the airfoil may experience streamwise airflows, denoted generally at 106. These streamwise airflows 106 may result when a fixed airfoil 102 moves through an air mass as part of a larger vehicle. These streamwise airflows 106 may also result when a rotary or movable airfoil is driven through the air mass. To control these streamwise airflows 106, the airfoil 102 may include any number of the cascaded array elements 104A-104C, disposed generally perpendicularly to these streamwise airflows 106 as shown.

The airfoil 102 may also experience leakage airflows, represented generally at 108. To control these leakage airflows 108, the airfoil 102 may include any number of cascaded array elements 104D and 104N. In the example shown, the cascaded array element 104D is installed on one side of the airfoil 102, while the cascaded array element 104N is installed on an opposite side of the airfoil 102. For this reason, FIG. 1 represents the array element 104N in dashed outline.

In some implementations, the cascaded array elements 104D and 104N may be installed onto the surface of the airfoil 102, without substantially modifying the structure underlying the airfoil. Aside from receiving electrical power from the vehicle, the array elements 104D and 104N may have minimal structural impact on the vehicle to which it is installed.

Considered together, the cascaded array elements 104 may control airflows moving over the airfoil 102 in streamwise and/or spanwise directions. To describe the types of control provided by the array elements 104, the discussion now turns to FIG. 2.

Figure 2:
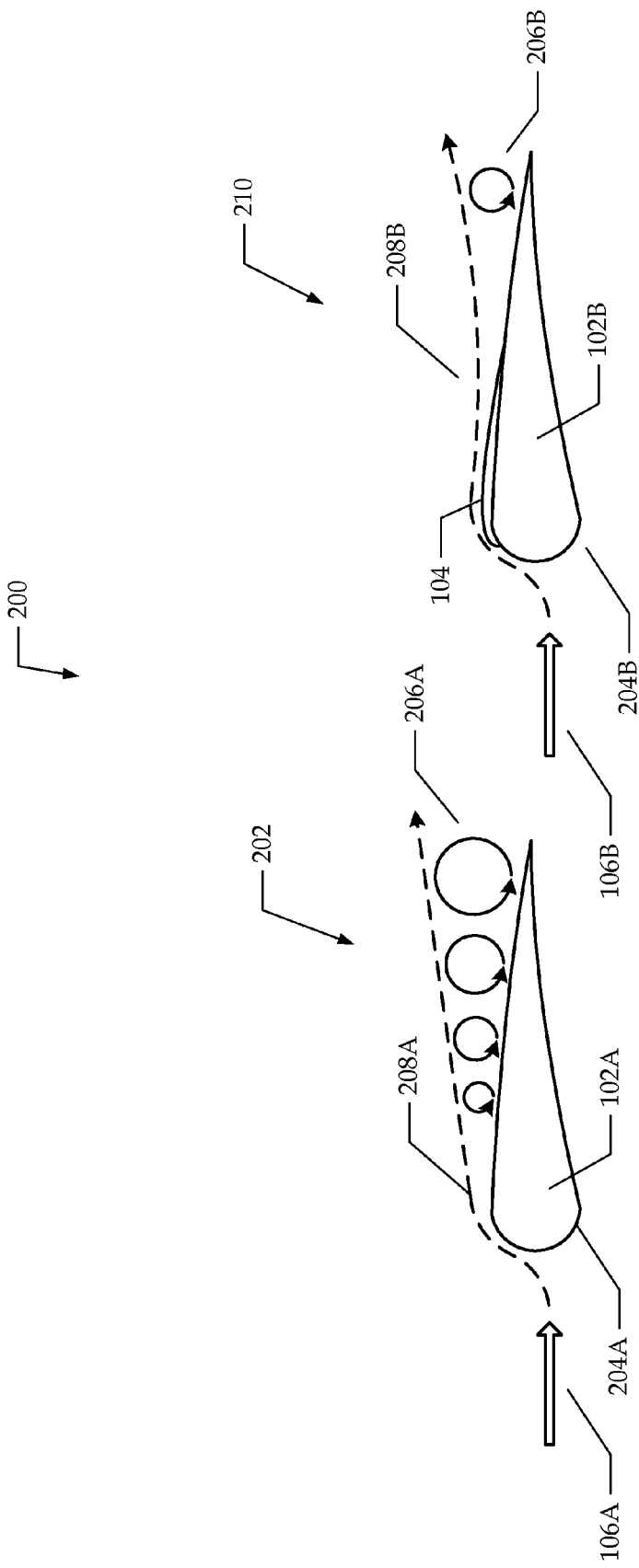
FIG. 2 is a schematic diagram illustrating how the cascaded arrays shown in FIG. 1 may selectively adjust a point at which turbulent air flows separate from the airfoil.

FIG. 2 illustrates separation points of airflows, denoted generally at 200, passing over an airfoil (e.g., 102A and 102B) in different scenarios. In a first scenario, denoted generally at 202, the airfoil 102a experiences a streamwise airflow 106A. In the scenario 202, the airfoil 102A is not equipped with the cascaded array elements 104. When the airflow 106a encounters a leading edge 204A of the airfoil 102A, at least a portion of the airflow 106A may pass over the airfoil 102, as shown. In certain aerodynamic conditions, the airflow 106A may experience turbulent conditions, denoted generally at 206A. At some point along the airfoil 102A, denoted generally at 208A, the airflow 106A may separate from the airfoil 102A.

If the separation point 208A is sufficiently close to the leading edge 204A, additional drag force on the airfoil 102A may be created, reducing the lift capability provided by the airfoil. In extreme cases, the airfoil 102A may experience stall conditions.

In another scenario, denoted generally at 210, the airfoil 102B experiences a streamwise airflow 106B. As the airflow 106B encounters the leading edge 204B of the airfoil 102, at least a portion of the airflow 106B may pass over the top of the airfoil 102B, as shown. In the scenario 210, the airfoil 102B is equipped with one or more of the cascaded array elements 104. These cascaded array elements 104 may be installed anywhere along the airfoil 102B as appropriate, with the location shown in FIG. 2 provided only as an example to facilitate this description.

Turning to the array elements 104 in more detail, these array elements 104 may operate as described herein selectively to control the separation point 208B along the surface of the airfoil 102B. In the example scenario 210, the array elements 104 operate to move the separation point 208B further down the airfoil 102B. FIG. 2 illustrates the separation point 208B at an arbitrary, non-limiting location along the airfoil 102B. In this scenario 210, a separated portion 206B of the airflow 106B is moved further down the airfoil, thereby increasing the lift capacity of the airfoil and increasing the lift rate of an airborne vehicle, while also reducing the prospect of a stall condition.

Having illustrated how the array elements 104 may selectively control the separation point 208 along the airfoil 102, the discussion now turns to a more detailed description of the array elements 104. This description is now provided with FIG. 3.

FIG. 3 illustrates a unit, denoted generally at 300, which is to be stacked in a form of a cascade array to generate and move plasma clusters. The cascaded arrays 104 as shown in the previous Figures may include any number of these plasma generation units 300.

Turning to the plasma generation units 300 in more detail, these units may include electrode 302 and a dielectric 304. In the examples shown in FIG. 3, the electrode 302 and the dielectric 304 may be elongated to any convenient length, and may be constructed to have any suitable thickness.

FIG. 4 illustrates constructions, denoted generally at 400, including several of the plasma generation units 300A-300N (collectively, plasma generation units 300), with a given cascaded array 104 including any number of the plasma generation units 300. As shown in FIG. 4, the plasma generation unit 300A may include the electrode 302A and the dielectric 304A. Likewise, the plasma generation unit 300B may include the electrode 302B and the dielectric 304B, the plasma generation unit 300C may include the electrode 302C and the dielectric 304C, and the plasma generation unit 300N may include the electrode 302N and the dielectric 304N. While FIG. 4 illustrates four examples of the units 300A-300N, it is noted that implementations of this description may include any number of the units 300.

Turning to FIG. 4 in more detail, the cascaded array 104 may be constructed so that the dielectric 304A is sandwiched between the electrodes 302A and 302B, the dielectric 304B is sandwiched between the electrodes 302B and 302C, and so on. In the example shown in FIG. 4, the dielectric 304A is slightly longer than the electrode 302A, the electrode 302B is slightly longer than the dielectric 304A, and so on.

As shown and discussed further below in FIG. 7, the cascaded array 104 may also be constructed to have a curved, bent, or non-planar configuration. In these latter configurations, the electrodes and dielectrics may be staggered relative to one another, resulting in a generally stair-stepped arrangement. In this arrangement, a given electrode may extend somewhat beyond the dielectric immediately above it in the array, the dialectic immediately below the given electrode may extend beyond the electrode, and so on.

In the configuration shown in FIG. 4, the cascaded array 104 may define a plurality of areas 306A, 306B, 306C, AND 306N (collectively, areas 306) suitable for generating plasma clusters. These plasma clusters are illustrated and described in more detail with FIG. 6 below. However, for the purposes of describing FIG. 4, the area 306A may be generally defined by how much the dielectric 304A and the electrode 302B extend past the end of the electrode 302A. Similarly, the area 306B may be defined generally by how much the dielectric 304B and the electrode 302C extend past the end of the electrode 302B, and the area 306C may be defined by how much the dielectric 304C and a next electrode (not shown) extend past the electrode 302C. Finally, the area 306N may be defined by how much a dielectric 304N extends past the electrode 302N. It is appreciated from this description of FIG. 4 that the construction of the array 104 may be extended to any level of cascade.

FIG. 5 illustrates additional constructions, denoted generally at 500, of the cascaded array 104. More specifically, the cascaded array 104 may include any number of units 300A-300N, which in turn may include respective pairs of electrodes 302A-302N and dielectrics 304A-304N that are cascaded into arrays for generating and moving plasma. The dielectrics 304A, 304B, 304C, and 304N may also be shortened, as well as the electrodes 302B, 302C, and 302N. These shortened electrodes and dielectrics may increase the physical flexibility of the overall cascaded array.

Comparing the cascaded arrays 104 as shown in FIGS. 4 and 5, the dielectrics 304 as shown in FIG. 5 are approximately the same lengths. However, the dielectrics 304 as shown in FIG. 4 are various different lengths, depending on where they are located within the cascaded array 104. Referring to both FIGS. 4 and 5, the cascaded arrays 104 may be disbanded or cascaded in a first direction (e.g., horizontally, as represented by the arrow 502), and may be disbanded or cascaded in another direction (e.g., vertically, as represented by the arrow 504). The cascading in the direction represented by the arrow 502 may depend on how much different units 300A-300N are staggered relative to one another. The cascading in the direction represented by the arrow 504 may depend on the thicknesses of the electrodes 302 and the dielectrics 304.

Figure 6:
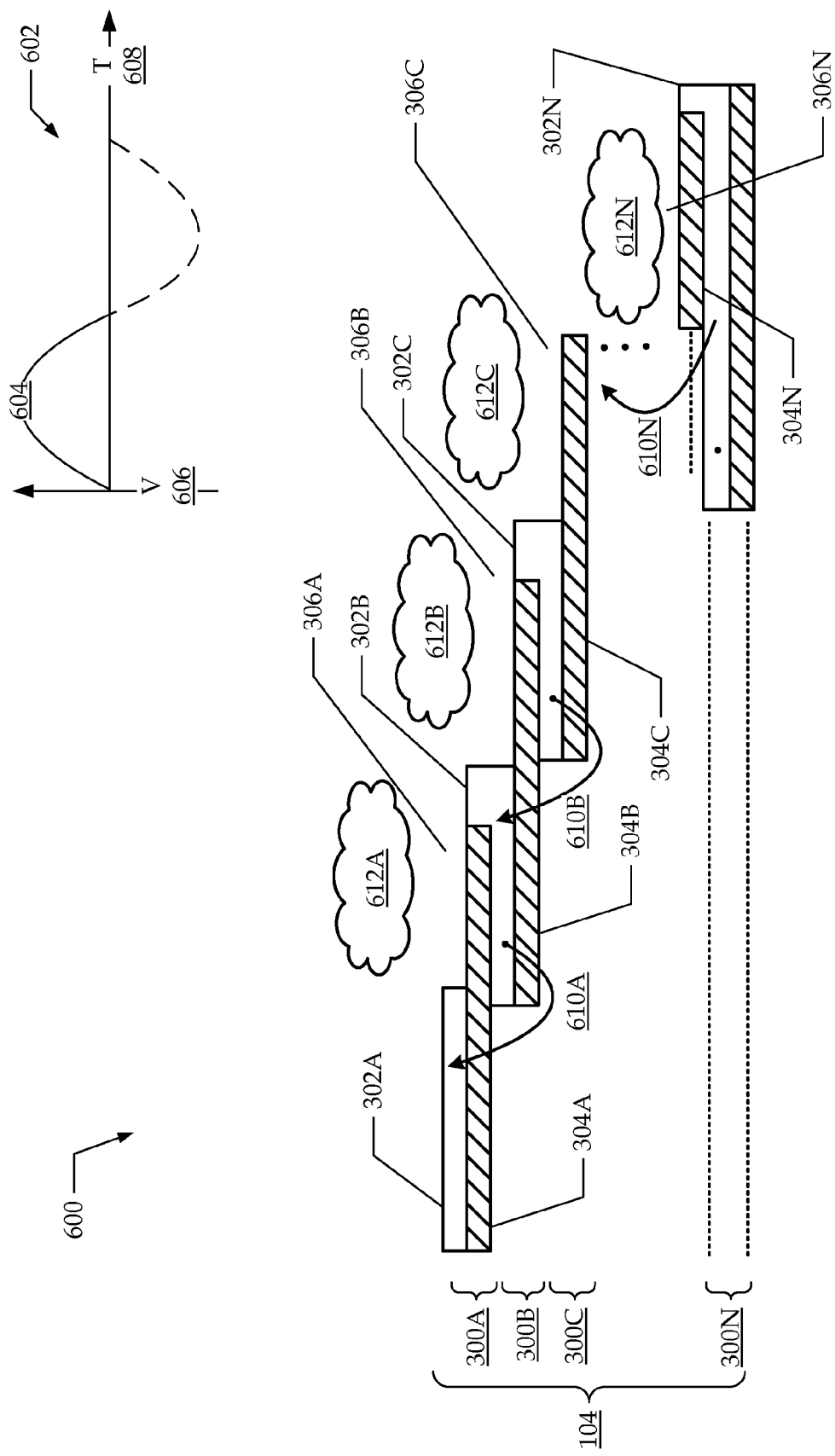
FIG. 6 is a diagram illustrating plasma clusters generated by the cascaded arrays in response to a first phase of an input voltage waveform.

FIG. 6 illustrates scenarios, denoted generally at 600, by which a given cascaded array 104 may operate the different units 300A-300N to generate plasma clusters at the different areas 306A-306N. More specifically, the cascaded array 104 may operate in response to an input waveform, denoted generally at 602. Referring to the input waveform 602, input power 604 (expressed without limitation as input voltage) may have shape, amplitude and/or polarity 606 that varies over time 608. Put differently, the input power 604 may alternate periodically over time.

Figure 8:
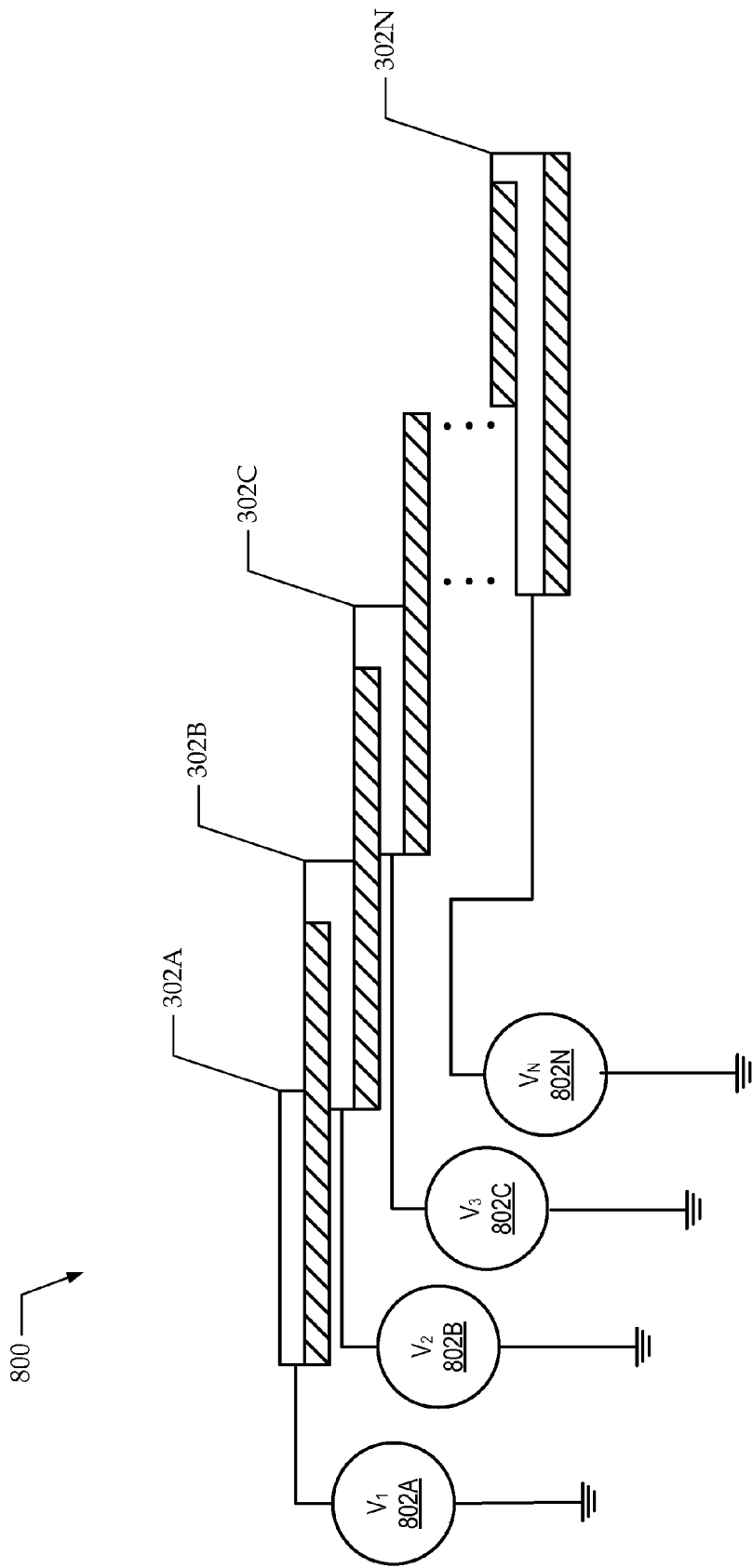
FIG. 8 is a circuit diagram illustrating an example of a voltage supply for the cascaded array.
Figure 9:
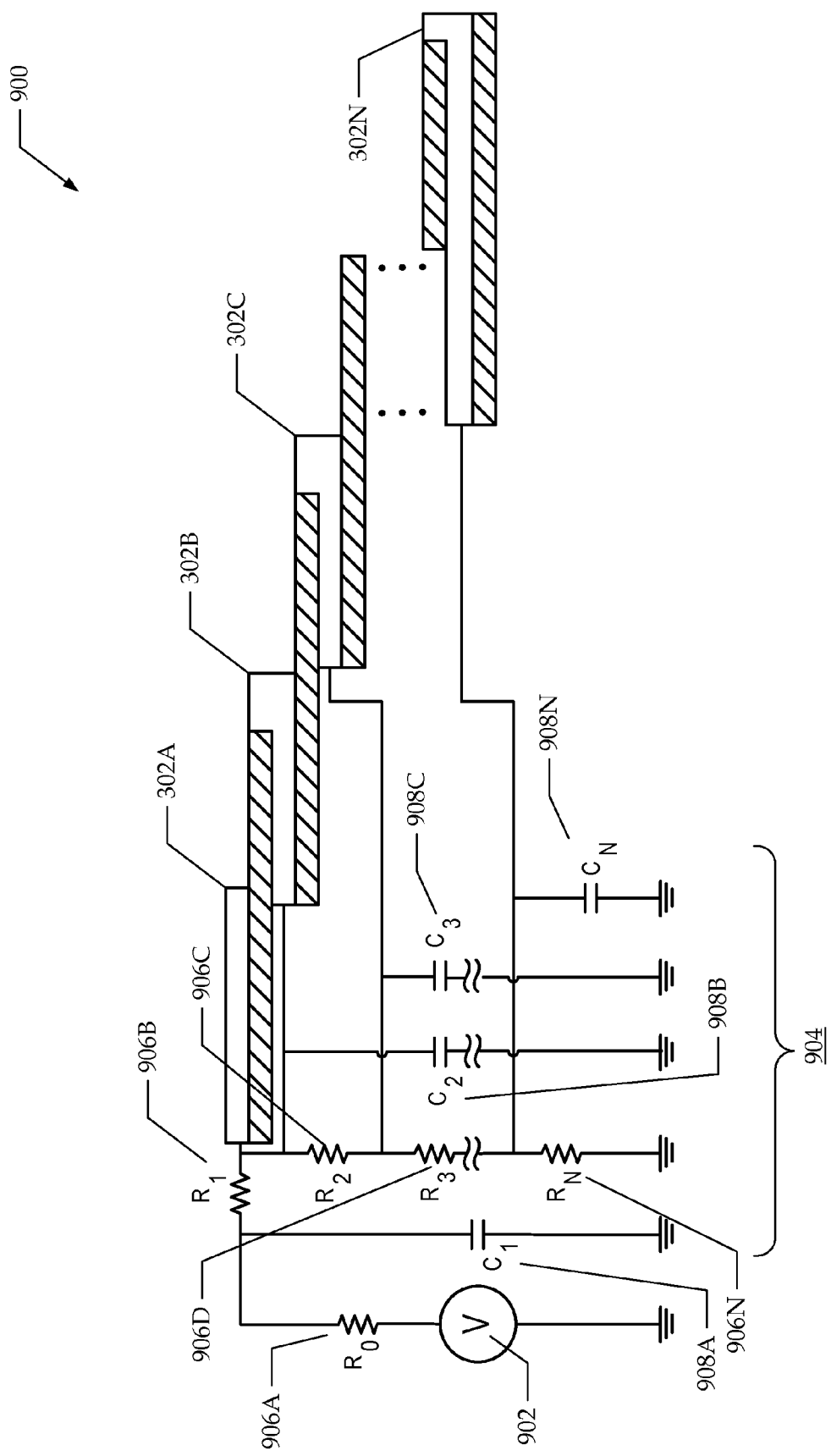
FIG. 9 is a circuit diagram illustrating another example of a voltage supply for the cascaded array.
Figure 10:
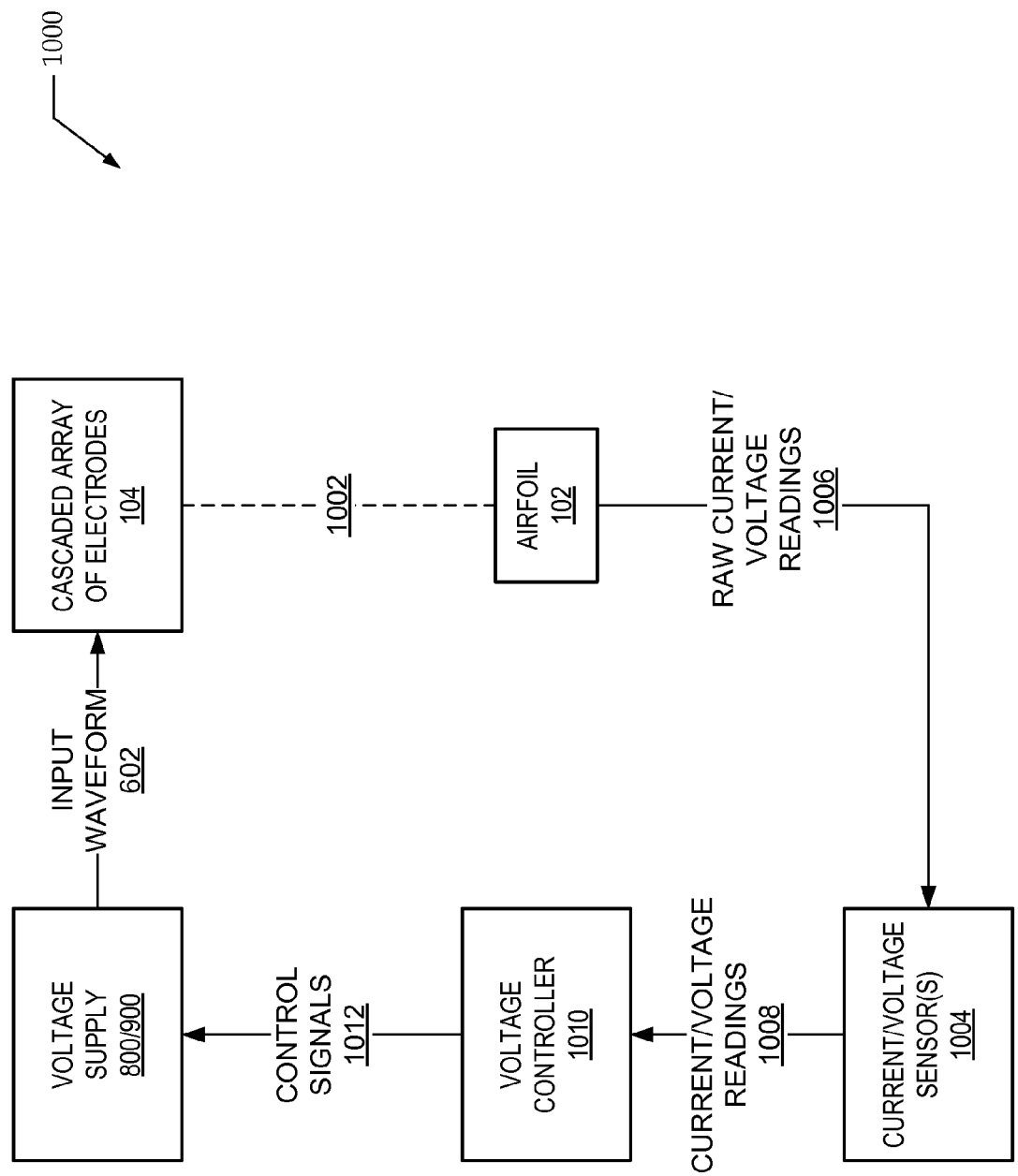
FIG. 10 is a block diagram illustrating voltage sensors and a voltage controller for regulating the voltage supply.

As detailed further in FIGS. 8-10, the various electrodes 302A-302N may be coupled to receive the input voltage 604. However, the details of these connections are omitted from FIG. 6 for convenience of description. Turning to FIG. 6 in more detail, the electrodes 302A and 302B may define a voltage 610A relative to one another, across the dielectric 304A. In response to a first phase (or half) of a cycle of this voltage, gas or air proximate the area 306A may ionize, to form a plasma cluster 612A.

In a similar manner, the electrodes 302B and 302C may define a voltage 610B across the dielectric 304B, causing generation of the plasma cluster 612B. Likewise, the electrodes 302N and the previous electrode 302(N−1) (not shown) may define a voltage 610N across the dielectric 304N, causing generation of the plasma cluster 612N.

The electrodes 302B, 302C, and 302N may be L-shaped in configuration, with a thicker portion arranged as shown in FIG. 6. The thicker portions of the electrodes 302B, 302C, and 302N may place a portion of the electrodes generally flush with the dielectrics immediately above the electrodes. This configuration may promote the generation of the plasma clusters 612 in the areas 306.

Figure 7:
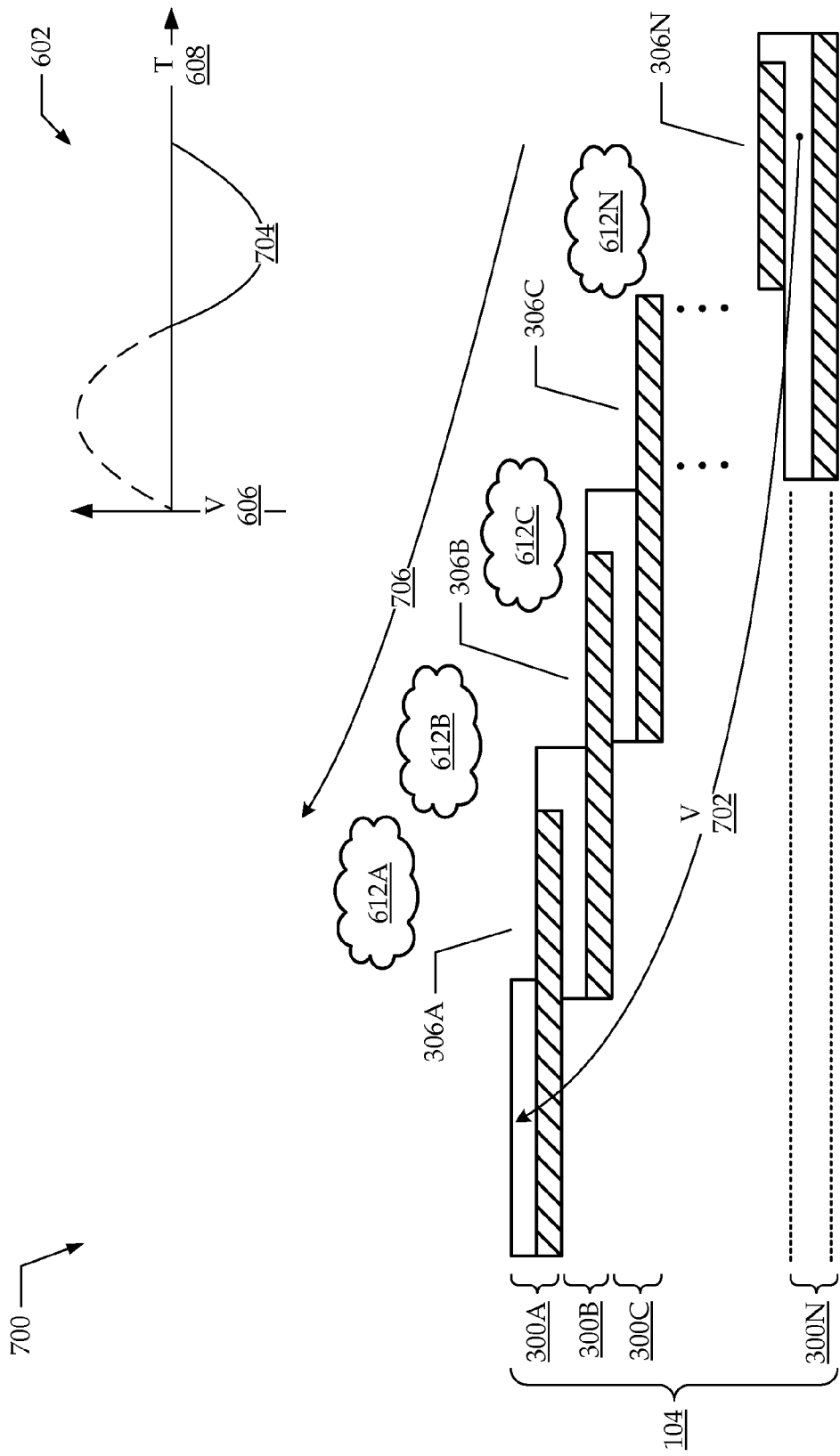
FIG. 7 is a diagram illustrating movement of the plasma clusters generated in FIG. 6, in response to a subsequent phase of the input voltage waveform.

FIG. 7 illustrates scenarios, denoted generally at 700, by which the plasma clusters 612A-612N that were generated in FIG. 6 are moved in response to an alternative phase of a cycle 604 of the input waveform 602. For example, assuming an input waveform 602 that represents an alternating-current (AC) power source, the scenario shown in FIG. 6 may occur during one phase 604 of the AC power source, while the scenario shown in FIG. 7 may occur during a subsequent phase 702 of the power source.

It is noted that the examples of the input waveforms 602 are provided only for ease of illustration, but not to limit possible implementations. More specifically, it is noted that the input waveforms may take other forms, without departing from the scope and spirit of this description. Examples of such other forms may include, but are not limited to: saw-toothed waveforms, triangular waveforms, waveforms having non-uniform or non-standard duty cycles, and other waveforms not specifically illustrated herein. In general, different waveforms may be chosen or customized as suitable for the circumstances of particular implementation scenarios, so as to achieve particular predefined plasma generating and displacement effects.

FIG. 7 carries forward the example cascaded array 104, which may include the units 300A-300N for generating the plasma clusters 612A-612N in the vicinity of the respective areas 306A-306N. Taken as a whole, the units 300A-300N may be subjected to a cumulative voltage 702 at the second phase of the cycle 602, which was shown in FIG. 6. As the input waveform 602 enters the phase 704, the voltage applied to the units 300A-300N may cause the plasma clusters to transition. Similarly, the same effect may qualitatively be achieved by applying the phase 704 between the adjusted pairs of electrodes 302A and 302B, generating voltage 610A of the opposite polarity; between the adjusted pairs 302B and 302C, generating voltage 610B of the opposite polarity, and so on. Likewise, the phase 704 may be applied between the electrodes 304N and 304(N−1) (not shown) generating voltage 610N of the opposite polarity. These reverse steps may be done simultaneously or subsequently.

Assuming that the cascaded array 104 is installed on the surface of an airfoil, the movement of the plasma clusters 612A-612N may collectively induce air bulk movements along the surface of the airfoil, in the direction indicated by the arrow 706. In this manner, the voltage transitions occurring through the units 300 may induce air movements along the airfoil, thereby selectively controlling the separation point (e.g., 208B in FIG. 2).

Generalizing from the example shown in FIGS. 6 and 7, the waveform 602 has applied to the units 300 in the cascaded array 104 may be adjusted, so as to induce air movements in any direction by generating and moving plasma clusters as appropriate. In general, the different units 300 may be controlled individually, so as to induce movement of the plasma clusters generated at the different units.

FIG. 8 illustrates examples of power supply systems, denoted generally at 800, for supplying voltage to the electrodes 302A-302N within the cascaded array. In the scenario shown in FIG. 8, the individual electrodes 302A-302N are associated with respective discrete or individual power supplies 802A-802N (collectively, individual power supplies 802). These individual power supplies 802 may operate to generate waveforms (e.g., 602 shown in FIGS. 6 and 7), and provide them as input to the respective electrodes 302A-

302N. As such, these individual power supplies 802 may provide AC custom waveforms to the electrodes 302A-302N.

FIG. 9 illustrates examples of power supply systems, denoted generally at 900, for supplying voltage to the electrodes 302A-302N in the cascaded array. In the power supply systems 900 shown in FIG. 9, a single power supply 902 may supply voltage to a resistor-capacitor (RC) network, which is denoted generally at 904. The example RC network 904 may include resistors 906A-906N (collectively, resistors 906) and capacitors 908A-908N (collectively, capacitors 908) coupled as shown in FIG. 9. The RC network 904 may receive an AC waveform from the power supply 902, and may generate appropriate waveforms (e.g., 602 as shown in FIGS. 6 and 7) for input to the different electrodes 302A-302N.

In illustrating the power supply scenarios shown in FIGS. 8 and 9, it is noted that the electrodes 302 are shown as configured only for convenience, but not to limit possible implementations. More specifically, the electrodes 302 may be configured differently than shown in FIGS. 8 and 9, while also incorporating the individual power supplies 802 or the RC network 904. Referring to FIG. 8, the number of individual power supplies 802 included in a given implementation may depend on how many individual electrodes 302 are included in that implementation. Referring to FIG. 9, the particular configuration of the RC network 904 may depend on how many individual electrodes 302 are included in a given implementation. In addition, the individual resistors 906 and capacitors 908 may be configured differently than as shown in FIG. 9, without departing from the scope and spirit of the present description.

It is also noted that FIG. 9 illustrates non-limiting examples of utilizing a single power supply 902 to control electrodes. However, these examples may be extended to other scenarios. For example, one given power supply 902 may control two or more electrodes at the same time, while not necessarily delivering the same potential to these two or more electrodes.

Implementations of this description may also generate individual custom waveforms for input to the different electrodes 302A-302N from a single power supply 902 using circuits other than an RC network. In addition, these input waveforms may be generated using RC networks other than the network 904 shown as an example in FIG. 9.

FIG. 10 illustrates voltage control systems, denoted generally at 1000, for regulating the voltage supply as provided to the cascaded array of electrodes. For clarity of illustration, FIG. 10 illustrates an airfoil, as discussed previously, in block form at 102. FIG. 10 also illustrates a cascaded array of electrodes, as discussed previously, in block form at 104. The cascaded array 104 is assumed to be installed on the airfoil, as represented generally by the dashed line 1002. In addition, FIG. 10 illustrates a voltage supply, which may represent the voltage supplies 800 or 900 as shown in FIG. 8 or 9. As described previously, the voltage supply 800 or 900 may generate the input waveforms 602 to the cascaded arrays 104.

Any number of voltage and/or current sensors 1004 may be installed to monitor cascade array's voltage and current on the airfoil 102. At given times, the sensors 1004 may obtain raw current/voltage readings, as represented generally at 1006. In turn, the sensors 1004 may process or condition these readings 1006 as appropriate, and provide them as input current/voltage readings 1008 to a voltage controller 1010.

Turning to the voltage controller 1010 in more detail, this controller may analyze the current/voltage conditions at a given time on the airfoil 102, and generate control signals 1012 in response to these conditions. In turn, the voltage supply 800/900 may receive the control signals 1012, and generate the input waveform 602 in response to the control signals 1012. For example, if the conditions as indicated by the sensors 1004 suggest that arcing on the airfoil 102 may be imminent, the voltage controller 1010 may adjust the control signals 1012 so as to minimize the risk of arcing.

In this manner, the voltage controller 1010 may regulate the operation of the voltage supply 800/900, based on present conditions sensed on the airfoil 102. In addition, the voltage controller 1010 may individually control the waveforms sent as input to the different plasma generation units (e.g., 300 in FIG. 3), so as to achieve a desired air bulk movement. The voltage controller 1010 may incorporate analog and/or digital circuitry in different possible implementations, and may also include software components as well.

Having provided the above description of FIGS. 1 through 10, several observations are noted. The vertical and horizontal disbanding or cascading techniques as described and illustrated herein may generate plasma clusters that are closer together, as compared to previous techniques. In the aggregate, these generated plasma clusters may be larger, as compared to these previous techniques. Thus, these larger plasma clusters may induce greater movements of air, and provide greater levels of control over the separation point or span- or stream-wise airflow on a given airfoil.

In addition, by providing two-dimensional disbanding of the plasma generation units, the electrode-dielectric units described herein may reduce or minimize the effect of counterforces acting between neighboring electrode pairs, as compared to the previous techniques. In some previous approaches, multiple plasma generation units may be placed on a single dielectric. However, if these plasma generation units are placed too close together, then the plasma clusters generated by neighboring units may exert counterforces on one another, reducing the overall size of the plasma clusters.

In some implementations, the various electrodes and dielectrics described herein may have thicknesses of approximately 0.5 mm or below. Cascaded arrays of plasma generating units constructed to this scale may provide more plasma-generating units per unit length of airfoil, as compared to previous techniques. With more plasma-generating units per unit length of airfoil, more plasma may also be generated per unit length of airfoil.

Reduced power consumption may result from managing and controlling airflow locally at the plasma-generating units. In contrast, previous techniques may control airflow from a centralized location that manages the plasma-generating units remotely.

Although the previous Figures illustrate certain example configurations of the plasma-generating units, implementations of this description may also include plasma-generating units having other configurations as well. These configurations may be suitable for inducing vortex air patterns, or other types of complex airflows.

The above description provides several examples in which airflows are induced in particular directions. However, it is noted that the notion of "controlling" airflows, as provided in this description, may include suppressing airflows as well. For example, referring to FIG. 1, the cascaded arrays 104d may operate to suppress the spanwise or leakage airflows 108.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

What is claimed is:

1. An array of electrodes for generating plasma, the array comprising:
   a first electrode having a leading and trailing edge disposed along a first dielectric;
   a second electrode having a leading and trailing edge sandwiched between the first dielectric and a second dielectric such that the leading edge of the first electrode is coincident with or extending beyond the trailing edge of the second electrode;
   at least a third electrode having a leading and trailing edge, wherein the second dielectric is sandwiched between the second and third electrodes such that the leading edge of the second electrode is coincident with or extending beyond the trailing edge of the third electrode;
   at least one power supply providing electrical power to the first, second, and at least third electrodes; and
   a power supply controller operative to control the power supply, so as to regulate the electrical power supplied to the first, second, and at least third electrodes, and so as to cause the first, second, and at least third electrodes to generate and move plasma, thereby inducing air bulk motion along an airfoil.

2. The array of claim 1, wherein the first electrode, first dielectric and the second electrode comprise a first plasma-generating unit that is independently controllable by the power supply controller, or controllable by a resistor-capacitor (RC) network coupled to the power supply controller, to generate a first plasma cluster proximate the first unit, and wherein the second electrode, second dielectric and third electrode comprise a second plasma-generating unit that is controllable by the power supply controller, or controllable by the RC network, to generate at least a second plasma cluster proximate the second unit.

3. The array of claim 2, wherein the power supply controller is operative to coordinate generation of the plasma clusters by the electrodes, to cause the first and second electrodes to move the first plasma cluster, and to cause the second and third electrodes to move the second plasma cluster independently of, or in cooperation with, moving the first plasma cluster.

4. The array of claim 1, wherein the first dielectric has a leading edge that extends beyond the trailing edge of first electrode, and wherein the leading edge of the dielectric is exposed to air when the array is installed onto a vehicle.

5. The array of claim 4, wherein the second electrode has a leading edge that extends beyond the first dielectric, and wherein the second dielectric has a leading edge that extends beyond a trailing edge of the second electrode.

6. The array of claim 1, wherein the power supply applies a waveform to the electrodes.

7. The array of claim 6, wherein the electrodes are operative to generate respective plasma clusters in response to a first phase of a cycle of the applied waveform.

8. The array of claim 7, wherein the electrodes are operative to move the plasma clusters in response to a further phase of a cycle of the applied waveform.

9. The array of claim 1, wherein the first and second electrodes are elongated along respective lengths, and are arranged in parallel with one another so that at least the first and second electrodes are disbanded along their lengths.

10. The array of claim 9, wherein the second electrode is disposed relative to the first electrode and to the first dielectric, so that only a portion of the second electrode is exposed beyond the first dielectric.

11. The array of claim 1, wherein the first, second, and third electrodes and the first, second, and third dielectrics have respective thicknesses, such that the second electrode is cascaded from the first electrode along the thickness of the first dielectric, and the third electrode is cascaded from the second electrode along the thickness of the second dielectric.

12. A method for constructing an array of electrodes for generating plasma, the method comprising:
   providing at least first, second, and third electrodes, and at least first and second dielectrics;
   sandwiching the first dielectric between the first and second electrodes;
   staggering the second electrode relative to the first electrode, such that a first portion comprising a leading edge of the second electrode extends beyond a leading edge of the first dielectric and a second portion of the second electrode comprising a trailing edge does not extend beyond a leading edge of the first electrode;
   sandwiching the second dielectric between the second and third electrodes;
   staggering the third electrode relative to the second electrode, such that a first portion comprising the leading edge of the third electrode extends beyond the second dielectric and a second portion comprising a trailing edge of the second electrode does not extend beyond leading edge of the first electrode;
   placing the first, second, and at least third electrodes in communication with a power supply configured for providing electrical power to the first, second, and at least third electrodes; and
   providing a power supply controller operative to control individually the electrical power supplied to the first, second, and at least third electrodes, so as to generate and move respective first and second plasma clusters proximate the first and second dielectrics, inducing air bulk motion.

13. The method of claim 12, further comprising installing the array of electrodes onto an airfoil so as to control streamwise airflows.

14. The method of claim 12, further comprising installing the array of electrodes onto an airfoil so as to control spanwise airflows.

15. The method of claim 13, further comprising installing the array of electrodes onto the airfoil so as to control a separation point on the airfoil.

16. The method of claim 12, further comprising providing a resistor-capacity (RC) network, and coupling it to control the power supply.

* * * * *